J. O. NEIKIRK.
DUMP CAR.
APPLICATION FILED JULY 1, 1907.
904,004.
Patented Nov. 17, 1908.
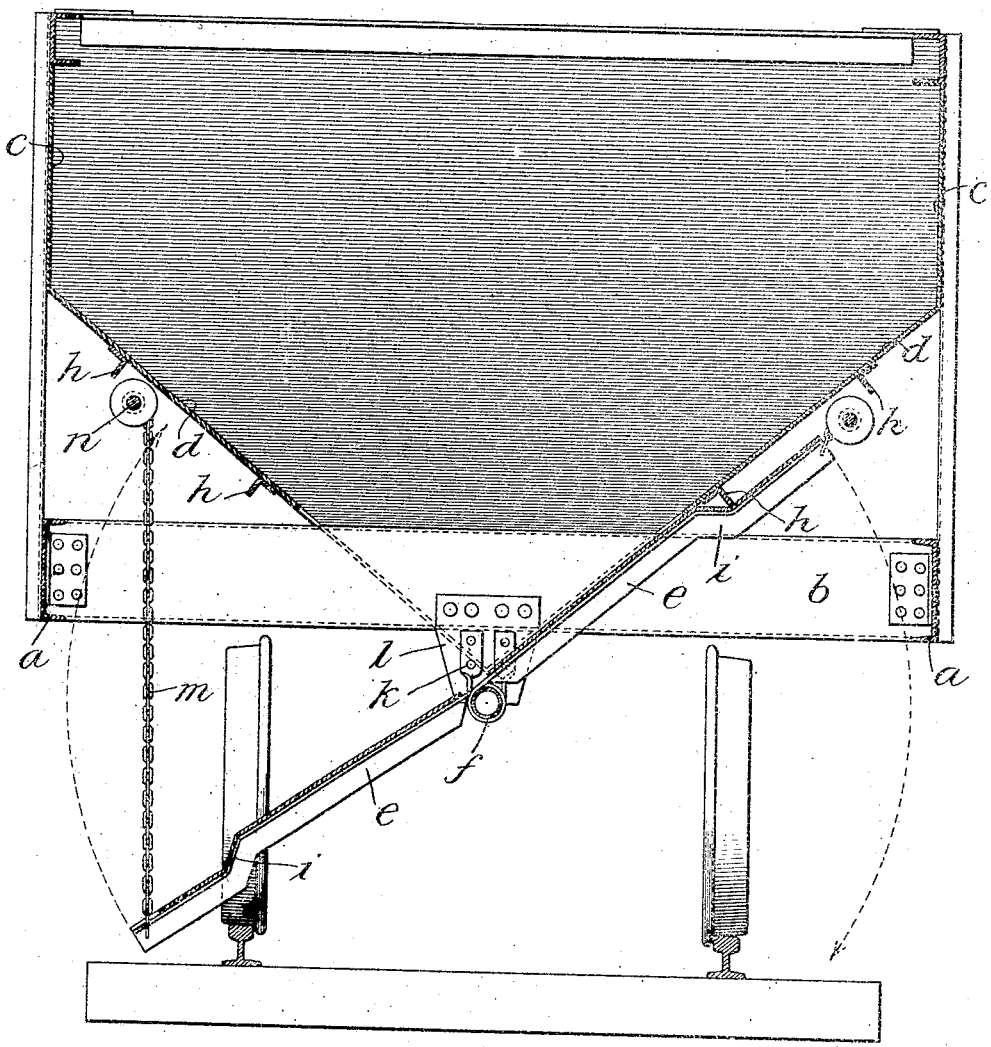
Witnesses:
John Enders
Chas H. Buell
Inventor.
John Oscar Neikirk.
By Sheridan & Wilkinson
Atty's

UNITED STATES PATENT OFFICE.

JOHN OSCAR NEIKIRK, OF MORGAN PARK, ILLINOIS, ASSIGNOR TO RODGER BALLAST CAR COMPANY, A CORPORATION OF MAINE.

DUMP-CAR.

No. 904,004.  Specification of Letters Patent.  Patented Nov. 17, 1908.

Application filed July 1, 1907. Serial No. 381,703.

*To all whom it may concern:*

Be it known that I, JOHN OSCAR NEIKIRK, a citizen of the United States, residing at Morgan Park, in the county of Cook and State of Illinois, have invented certain new and useful Improvements in Dump-Cars, of which the following is a specification.

An object of my invention is to provide a dump car which will have a low center of gravity when loaded and from which the load may be discharged upon either side of the track.

Another object of my invention is to provide an improved dump car having comparatively small central discharge door openings controlled by doors which when open will serve to direct the contents of the car beyond the rails at either side of the car.

The drawing represents in cross section a car constructed in accordance with my invention.

In the form of my invention illustrated, the underframe of the car consists of the usual side sills $a$ and transverse sills $b$. The space between these sills, or at least the central portion thereof, is open and unobstructed in order to provide space for the lower part of the car bottom. In the car illustrated, the upper parts $c$ of the sides are vertical. The floor or bottom of the car slopes inwardly from the lower edges of the sides and consists of an upper fixed part $d$ and a lower part consisting principally of dump doors $e$. The dump doors are hinged along the longitudinal center of the car upon a shaft $f$. In some cases, however, it may be desirable to hinge the doors upon separate shafts instead of upon single shafts, as shown. The shaft $f$ is so positioned that when the dump doors are closed they lie substantially in the same plane as the upper fixed part $d$ of the car bottom.

It is obvious that when the dump doors upon one side of the car are opened the entire load will be discharged upon that side. In order to prevent the load from falling upon or inside of the rails, it is desirable that the doors be of sufficient width to extend beyond the rails when opened, as shown in the drawing. Inasmuch however, as it would be undesirable to make the door openings of as great width as it is necessary to construct the doors in order to carry the load beyond the rails, I make the door openings of the proper width and arrange the doors to extend a considerable distance beyond and beneath the lower edge of the fixed part $d$ of the car bottom. The parts $d$ are reinforced upon their lower edges by angle irons $h$ or other suitable means. In order that the extended outer edges of the doors may clear the angle irons $h$ when closed, I have deflected the outer part thereof, as shown, the plate forming the door and the reinforcing members beneath the door being bent outwardly at $i$.

In the embodiment of the invention illustrated in the drawing, the dump doors are hinged upon the shaft $f$. This shaft is shown as being supported in a strap $k$ riveted to a plate $l$, which is in turn secured to the transverse sill $b$ by means of rivets.

The doors may be operated by any suitable mechanism. In the present instance I have shown a chain $m$ adapted to be wound upon the shaft $n$ in the manner customary in cars of this type.

I desire to call particular attention to the arrangement of the parts by which the center of gravity of the car body with or without its load is carried at a moderate height. If the car had a center sill this would necessarily be above the trucks and the hinges of the dumping doors would be still higher.
Thus, the bulk of the load will be carried comparatively high up and the car would be lacking in stability. By employing side sills with this particular type of dump car, instead of a center sill, and dumping between and under the side sills, I am able to carry the load at a very moderate height with an obvious increase in the stability thereof.

While I have illustrated a specific embodiment of my invention, I do not desire to have it understood that my invention is limited thereto, but covers the subject-matter defined in the appended claims.

What I claim is:

1. In a dump car, the combination with an underframe comprising side sills and transverse members connected to the side sills, of a car body comprising a floor formed of rigid floor sections sloping downwardly and inwardly from the sides of the car body and dump doors hinged at the longitudinal center of the car below the plane of the side sills, means for pivotally supporting the inner edges of the dump doors, and means for closing and opening said doors by swinging them toward and away from the rigid floor sections.

2. In a car, floor sections sloping downwardly from the sides toward the center, said floor sections being provided with door openings extending outwardly from the meeting line of the planes of said sections, and dump doors hinged adjacent the meeting line of the floor sections, said dump doors being of greater width than the door openings.

3. In a car, side sills, a car body between the side sills, floor sections sloping downwardly from the sides toward the center, said floor sections being provided with door openings extending outwardly from the meeting line of the planes of said sections, and dump doors hinged adjacent the meeting line of the floor sections, said dump doors being of sufficient width to extend beyond the track rails when lowered.

4. A dump car having stationary floor sections sloping downwardly from the sides thereof and extending to a point intermediate the center and side of the car, and dump doors hinged adjacent the center of the car and adapted when closed to lie in substantially the same plane as the stationary floor sections, said dump doors when closed extending outwardly beyond the inner edges of the stationary floor sections and being of sufficient width to extend beyond the track rails when lowered.

5. In a car, stationary floor sections sloping downwardly from the sides toward the center, movable floor sections hinged adjacent the center of the car and adapted when closed to lie in substantially the same plane as the stationary floor sections and being of sufficient width to extend beyond the inner edges of the stationary sections when closed and beyond the track rail when open.

6. In a car, stationary floor sections sloping downwardly from the sides toward the center, reinforcing members secured to the lower side of said stationary floor sections, movable floor sections hinged adjacent the center of the car and adapted when closed to lie in substantially the same plane as the stationary sections, the outer part of said movable sections extending beyond the inner edges of the stationary sections, said outer part of the movable sections being offset from the remainder thereof in order to clear said reinforcing members.

7. In a dump car, the combination with an underframe comprising side sills and transverse members connected to the side sills, of a car body comprising a floor formed of rigid floor sections sloping downwardly and inwardly from the sides of the car body, and dump doors hinged at the longitudinal center of the car below the plane of the side sills, brackets depending from the transverse members of the underframe for pivotally supporting said doors, and means for closing and opening said doors by swinging them toward and away from the rigid floor sections.

8. In a dump car, the combination with an underframe comprising side sills and transverse members connected to the side sills, of a car body comprising the floor formed of rigid floor sections sloping downwardly and inwardly from the sides of the car body and dump doors hinged at the longitudinal center of the car below the plane of the side sills, means depending from the transverse members of the underframe for pivotally supporting said doors, longitudinal shafts journaled beneath the rigid floor sections, and chains connecting said shafts with the outer edges of the doors.

9. In a dump car, the combination with an underframe comprising side sills and transverse members connected to the side sills, of a car body supported upon said underframe, said car body having downwardly and outwardly swinging dumping doors hinged at the longitudinal center of the car below the plane of the side sills, means depending from the transverse members of the underframe for pivotally supporting the inner edges of said doors, and means for swinging said doors into upwardly and outwardly inclined positions to close the same and for permitting said doors to swing downwardly and outwardly into inclined positions to open them.

JOHN OSCAR NEIKIRK.

Witnesses:
EDYTHE M. ANDERSON,
JENNIE A. MACEDWARD.